United States Patent [19]

Nakaniwa et al.

[11] Patent Number: 4,911,131
[45] Date of Patent: Mar. 27, 1990

[54] FUEL CONTROL APPARATUS FOR INTERNAL COMBUSTION ENGINE

[75] Inventors: Shinpei Nakaniwa; Seiichi Otani; Naoki Tomisawa; Yukio Hoshino, all of Gunma; Syouzi Furuhashi; Tadashi Ariga, both of Kanagawa, Japan

[73] Assignees: Nissan Motor Company, Limited, Yokohama; Japan Electronic Control Systems Company, Limited, Isezaki, both of Japan

[21] Appl. No.: 230,387

[22] Filed: Aug. 10, 1988

Related U.S. Application Data

[63] Continuation-in-part of Ser. No. 67,007, Jun. 29, 1987, abandoned.

[30] Foreign Application Priority Data

Jun. 30, 1986 [JP] Japan .................... 61-151435

[51] Int. Cl.$^4$ ............................................. F02B 33/00
[52] U.S. Cl. .................................... 123/492; 123/478
[58] Field of Search ............... 123/492, 478, 445, 467, 123/472, 490

[56] References Cited

U.S. PATENT DOCUMENTS

| | | | |
|---|---|---|---|
| 4,627,404 | 12/1986 | Saito et al. | 123/492 |
| 4,640,254 | 2/1987 | Ninomiya | 123/492 |
| 4,662,340 | 5/1987 | Nagano | 123/492 |
| 4,781,163 | 11/1988 | Jautelat et al. | 123/492 |
| 4,800,860 | 1/1989 | Nanyoshi et al. | 123/492 |

Primary Examiner—Raymond A. Nelli
Attorney, Agent, or Firm—Foley & Lardner, Schwartz, Jeffery, Schwaab, Mack, Blumenthal & Evans

[57] ABSTRACT

An apparatus for use with a multi-cylinder internal combustion engine including a plurality of fuel injectors, each being operable in its open position for injecting fuel into an intake port with which an intake valve is in cooperation for regulating the entry of combustion ingredients into the corresponding cylinder. The apparatus includes a control circuit for operating the fuel injectors in a predetermined sequence. The control circuit determines a length of time one fuel injector to be operated is in its open position in response to selected engine operating conditions. The control circuit opens the one fuel injector at a time to terminate the determined time length substantially at the same time when the corresponding intake valve opens. In addition, the control circuit prolongs the determined time length in response to a demand for engine acceleration produced when the one fuel injector is in its open position.

14 Claims, 3 Drawing Sheets

FUEL CONTROL APPARATUS FOR INTERNAL COMBUSTION ENGINE

CROSS-REFERENCE TO THE RELATED APPLICATION

This application is a Continuation-in-Part Application of U.S. Pat. application Ser. No. 067,007, filed on June 29, 1987, which is now abandoned.

BACKGROUND OF THE INVENTION

This invention relates to a fuel control apparatus for use with multi-cylinder internal combustion engines and, more paticular, to a fuel control apparatus of the sequential fuel injection type operating a plurality of fuel injectors in a predetermined sequence.

Sequential fuel injection techniques have been used to inject fuel into a plurality of engine cylinders in a predetermined sequence. Such sequential fuel injection techniques provide significant advantages in that the injected fuel is in a finely atomized form so as to minimize combustion efficiency variations for the respective cylinders and minimize output torque variations.

It is the current practice to start fuel injection for one cylinder at a predetermined engine crankshaft position so as to terminate the fuel injection in the intake stroke of the corresponding piston. With such fuel injection control, however, the time at which the fuel injection is terminated varies with variations in engine speed. For this reason, the fuel injection is terminated sometimes after the termination of the intake stroke, causing poor combustion efficiency.

SUMMARY OF THE INVENTION

Therefore, a main object of the invention is to provide an improved sequential fuel injection type fuel control apparatus which is free from problems which may occur in the prior art fuel control apparatus.

It is another object of the invention to provide an improved sequential fuel injection type fuel control apparatus which can provide good acceleration characteristics.

There is provided, in accordance with the invention, an apparatus for use with a multi-cylinder internal combustion engine including a plurality of fuel injectors, each being operable in its open position for injection fuel into an intake port, with which an intake valve is in cooperation, for regulating the entry of combustion ingredients into the corresponding cylinder. The apparatus comprises sensor means sensitive to selected conditions of the engine for producing sensor signals indicative of the sensed engine conditions, and a control circuit for operating the fuel injectors in a predetermined sequence. The control circuit includes means responsive to the sensor signals for determining a length of time each fuel injector to be operated is in its open position. The control circuit includes means for opening one fuel injector at a time to terminate the determined time length substantially at the same time when the corresponding intake valve opens. The control circuit also includes means for prolonging the determined time length in response to a demand for engine acceleration produced when the one fuel injector is in its open position.

According to one aspect of the invention, an apparatus for use with a multi-cylinder internal combustion engine including a plurality of fuel injectors, each being operable in its open position for injecting, fuel into an intake port with which an intake valve cooperates for regulating the entry of combustion ingredients into the corresponding cylinder, comprises sensor means sensitive to select conditions of the engine for producing sensor signals indicative of the sensed engine conditions, and a control circuit operating the fuel injectors in a predetermined sequence, the control circuit including means responsive to the sensor signals for determining a fuel injection start time and a fuel injection terminating time based thereon so that the fuel injection terminating time substantially coincides to the opening time of an intake valve of a the intake port of corresponding one of the engine cylinders, the control circuit including means for operating one of the fuel injectors to open at the determined fuel injection start time and to close at the determined fuel injection terminating time, the control circuit including means for causing delay of the fuel injection terminating time in a controlled magnitude in response to a demand for engine acceleration.

Preferably, the control circuit further includes means for detecting a rate of change of the throttle position, and means for causing delay of the fuel injection terminating time determines the magnitude of delay according to the detected throttle position change rate.

According to another aspect of the invention, a fuel injection control apparatus for use with a multi-cylinder internal combustion engine includes a plurality of fuel injectors, each operable in its open position to inject fuel into an intake port, an intake valve associated with each fuel injector for cooperatively regulating the entry of combustion ingredients into the corresponding cylinder, sensor means producing signals indicative of selected engine conditions, and a control circuit including means for operating the fuel injectors in a predetermined sequence, the control circuit determining in response to the sensor signals the fuel injection starting and terminating times, the terminating time substantially corresponding to the opening of the intake valve of the corresponding cylinder, the control circuit including further means for delaying the terminating time for the injection of fuel in controlled response to the fuel demands of engine acceleration.

Practically, the control circuit further includes means for sensing a rate of change of the throttle position and extending the time during which the fuel injectors provide fuel to each associated cylinder in response to the detected throttle position change rate.

According to a further aspect of the invention, a fuel injection control system for use in a multi-cylinder internal combustion engine includes an air induction system for forming an air/fuel mixture and introducing the air/fuel mixture into the combustion chamber of each engine cylinder, a plurality of fuel injectors, each associated with an engine cylinder, the fuel injectors injecting a controlled amount of fuel into the induction system to form and introduce the air/fuel mixture into the combustion chamber of each engine cylinder, the fuel injectors adjusting the amount of fuel to be injected by varying the period from the start of injection to its termination, sensor means monitoring selected engine driving parameters, including engine speed and engine load and producing sensor signals indicative thereof, first means for determining fuel injection amount on the basis of the sensor signals, second means responding to the first means for determining the duration of the fuel injection periods from fuel injection start to termination, the second means terminating fuel injection at substantially the same time as the opening of the intake valve of the corresponding engine cylinder, and third means for detecting an engine acceleration demand to cause delay of the fuel injection terminating time for expansion of the period to perform fuel injection for acceleration enrichment.

According to a still further aspect of the invention, a fuel injection control system for a multi-cylinder internal combustion engine comprises an induction system for forming an air/fuel mixture and introducing the air/fuel mixture into the combustion chamber of each engine cylinder, a plurality of fuel injectors, each associated with an engine cylinder, for injectiing a controlled amount of fuel into the induction system to form the air/fuel mixture, the fuel injector determining the amount of fuel injected into each cylinder by adjusting the duration of the fuel injection period, sensor means for monitoring preselected engine driving parameters, including engine speed, engine load and producing sensor signals indicative thereof, first means for determining the amount of fuel to be injected from the sensor signals, second means for determining the fuel injection starting and terminating times on the basis of the amount of fuel to be injected, in response to the first means, the second means terminating the fuel injection to substantially coincide with the opening of the intake valve of the associated engine cylinder, and third means for detecting engine acceleration fuel demand and in response thereto lengthening the period during which fuel is injected into the cylinders.

According to a yet further aspect of the invention, a injection control system for a multi-cylinder internal combustion engine comprises an induction system for forming an air/fuel mixture and introducing the air/fuel mixture into the combustion chamber of each engine cylinder, a plurality of fuel injectors, each associated with an engine cylinder, for injecting a controlled amount of fuel into the induction system to form the air/fuel mixture, the fuel injector determining the amount of fuel injected into each cylinder by adjusting the duration of the fuel injection period, sensor means for monitoring preselected engine driving parameters, including engine speed, engine load and producing sensor signals indicative thereof, first means for determining the amount of fuel needed on the basis of the sensor signals, second means for determining the fuel injection starting and terminating time on the basis of the fuel needs in response to the first means, the second means setting the fuel injection terminating time to substantial coincidence with opening of the associated intake valve, and third means for monitoring throttle valve angular position and detecting any increase of throttle valve open angle at a rate greater than a predetermined rate to detect engine acceleration fuel demand, and in response to the demand, extending the period of fuel injection for each cylinder.

According to a still further aspect of the invention, a fuel injection control system for a multi-cylinder internal combustion engine comprises, an induction system for forming an air/fuel mixture and introducing the air/fuel mixture into the combustion chamber of each engine cylinder, a plurality of fuel injectors, each associated with an engine cylinder, for injecting a controlled amount of fuel into the induction system to form the air/fuel mixture, the fuel injector determining the amount of fuel injected into each cylinder by adjusting the duration of the fuel injection period, sensor means for monitoring preselected engine driving parameters, including engine speed, engine load and producing sensor signals indicative thereof, first means for deriving a fuel injection pulse having a pulse width defining an amount of fuel to be injected on the basis of the sensor signals, second means for setting the fuel injection terminating time at a time substantially corresponding to the time at which the intake valve of the associated engine cylinder opens and deriving the fuel injection starting time on the basis of the fuel injection pulse width, and third means for detecting engine acceleration fuel demand and in response thereto delaying the fuel injection terminating time for lengthening the period during which fuel is injected into the cylinders.

According to a still further aspect of the invention, a fuel injection control system for a multi-cylinder internal combustion engine comprises an induction system for forming an air/fuel mixture and introducing the air/fuel mixture into the combustion chamber of each engine cylinder, a plurality of fuel injectors, each associated with an engine cylinder, for injecting a controlled amount of fuel into the induction system to form the air/fuel mixture, the fuel injector determining the amount of fuel injected into each cylinder by adjusting the duration of the fuel injection period, sensor means for monitoring preselected engine driving parameters, including engine speed, engine load and producing sensor signals indicative thereof, first means for determining a fuel injection pulse width basically on the basis of the engine speed and engine load and modifying the fuel injection pulse width on the basis of selected correction parameters represented by the sensor signals, second means for determining the fuel injection starting time by setting the fuel injection terminating time at a time substantially coinciding with opening of the associated intake valve and on the basis of the fuel injection pulse width, and third means for monitoring throttle valve angular position and detecting any increase of throttle valve open angle at a rate greater than a predetermined rate to detect engine acceleration fuel demand, and in response to the demand, extending the period of fuel injection for each cylinder.

The third means may expand the fuel injection pulse width for lengthening the period in which fuel is injected, in response to the acceleration fuel demand. On such a case, the magnitude of extension of the fuel injection pulse width is variable depending upon the magnitude of acceleration fuel demand.

In the alternative, the third means produces an additional fuel injection pulse signal defining an extra fuel injection period within a given period after the fuel injection terminating time for retriggering the fuel injector to maintain the latter open through the extra fuel injection period. In such case, the third means produces the additional fuel injection pulse signal within the mechanical lag time of the fuel injector so that the fuel injector can be maintained open after the fuel injection terminating time. Furthermore, the third means may derive the pulse width of the additional fuel injection pulse on the basis of the magnitude of acceleration fuel demand.

BRIEF DESCRIPTION OF THE DRAWINGS

The present invention will be described in greater detail by reference to the following description taken in connection with the accompanying drawings, in which.

DETAILED DESCRIPTION OF THE INVENTION

Figure 1:
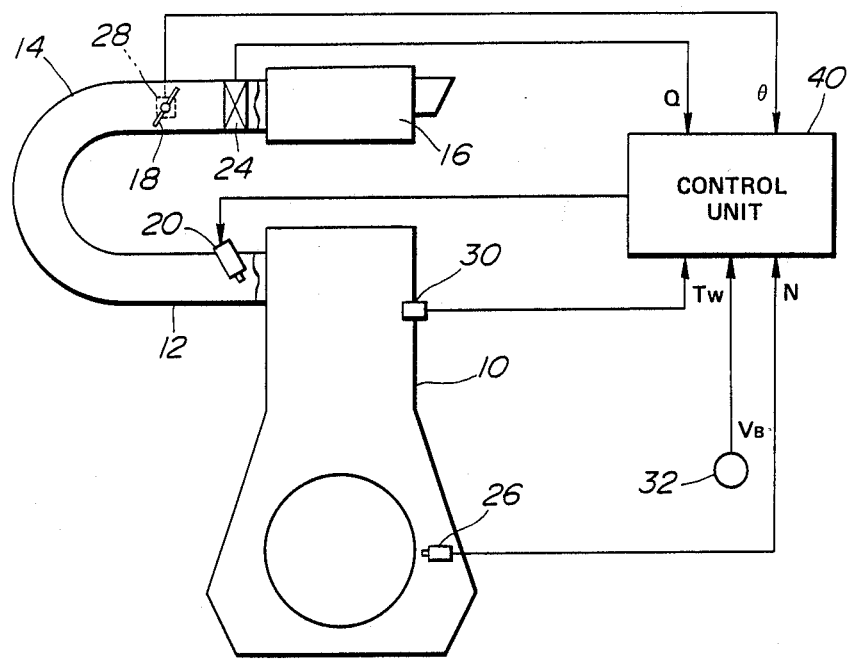
FIG. 1 is a schematic view showing one embodiment of a fuel control apparatus made in accordance with the invention.
Figure 4:
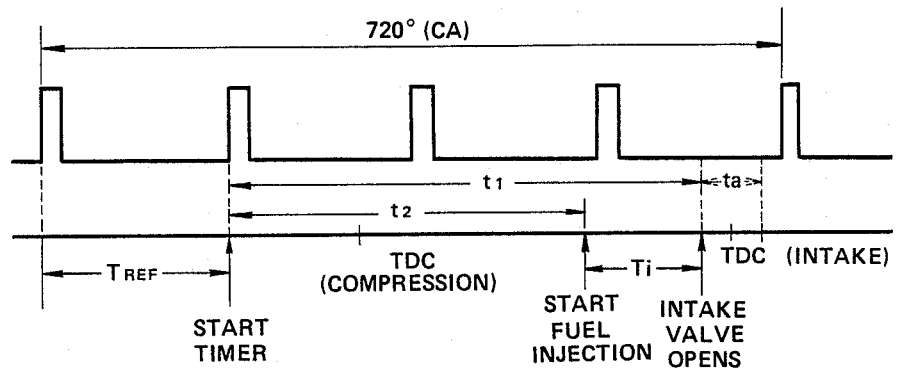
FIG. 4 is a time graph used in explaining the operation of the fuel control apparatus of the invention.

With reference to the drawings, and in particular to FIG. 1, there is shown a schematic diagram of an engine control system embodying the apparatus of the invention. An internal combustion engine, generally designated by the numeral 10, for an automotive vehicle includes an intake manifold 12 connected through an intake port, with which an intake valve cooperates for regulating the entry of combustion ingredients into the cylinder from the intake manifold 12. As well known in the art, a piston is mounted for reciprocal motion within the cylinder and a crankshaft is supported for rotation within the engine 10. A connecting rod is pivotally connected to the piston and the crankshaft to produce rotation of the crankshaft in response to reciprocation of the piston within the cylinder.

Air to the engine 10 is supplied through an air cleaner 16 into an induction passage 14. The amount of air permitted to enter the combustion chamber through the intake manifold 12 is controlled by a butterfly throttle valve 18 situated within the induction passage 14. The throttle valve 18 is connected by a mechanical linkage to an accelerator pedal. The degree of rotation of the throttle valve 18 is manually controlled by the operator of the engine control system.

A fuel injector 20 is connected to a conventional fuel supply system (not shown) which should be considered to comprise a fuel tank, a fuel pump, a fuel damper, a fuel filter, and a pressure regulator. The fuel pump is electrically operated and is capable of maintaining sufficient pressure. The fuel damper attenuates the fuel pressure to an extent. The fuel filter prevents any contaminants from reaching the fuel injector 20. The pressure regulator maintains the pressure differential across the fuel injector 20 at a constant level. This regulation is accomplished by a variation in the amount of excess fuel returned by the regulator to the fuel tank. The fuel injector 20 opens to inject fuel into the intake port when it is energized by the presence of electrical current. The length of the electrical pulse, that is, the pulse-width, applied to the fuel injector 20 determines the length of time the fuel injector 20 opens and, thus, determines the amount of fuel injected into the intake port.

In the operation of the engine 10, fuel is injected through the fuel injector 20 into the intake manifold 12 and mixes with the air therein. When the intake valve opens, the air-fuel mixture enters the combustion chamber. An upward stroke of the piston compresses the air-fuel mixture, which is then ignited by a spark produced by the spark plug in the combustion chamber. Combustion of the air-fuel mixture in the combustion chamber takes place, releasing heat energy, which is converted into mechanical energy upon the power stroke of the piston. At or near the end of the power stroke, the exhaust valve opens and the exhaust gases are discharged into the exhaust manifold.

Although the engine 10 as illustrated in FIG. 1 shows only one fuel injector 20, it should be understood that the engine control system described herein is of a so-called sequential injection type designed for use on a multi-cylinder engine. Thus, it should be understood that there are a plurality of cylinders, and also fuel injectors, intake valves, exhaust valves, reciprocating pistons and spark plugs relate to the number of cylinders in the engine 10.

The amount of fuel metered to the engine, this being determined by the width of the electrical pulses applied to the fuel injector 20, and the fuel-injection timing are repetitively determined from calculations performed by a digital computer, these calculations being based upon various conditions of the engine that are sensed during its operation. These sensed conditions include intake air flow, engine speed, throttle position, cylinder-head coolant temperature, and battery voltage. Thus, an intake flow meter 24, an engine speed sensor 26, a throttle position sensor 28, a cylinder-head coolant temperature sensor 30, and a battery voltage sensor 32 are connected to a control unit 40.

The intake flow meter 24 may comprise a thermosensitive wire placed in a bypass passage provided for the induction passage 14 upstream of the throttle valve 18. The engine speed sensor 26 may include a crankshaft position sensor and a reference pulse generator for producing a series of crankshaft position electrical pulses, each corresponding to one degree of rotation of the engine crankshaft, of a repetition rate directly proportional to engine speed and a reference electrical pulse at a predetermined number of degrees before the top dead center position of each engine piston, respectively. The throttle position sensor 28 preferably is a potentiometer electrically connected in a voltage divider circuit for supplying a DC voltage proportional to throttle valve position. The battery voltage sensor 32 senses the voltage of the vehicle battery on which the control unit 40 operates.

The control unit 40 controls the fuel-injection time-length and timing for each of the fuel injectors 20. The control unit 40 determines the length of time one fuel injector to be operated is in its open position in response to sensed engine operating conditions, and opens one fuel injector at a time to terminate the determined time length substantially at the same time when the corresponding intake valve opens. It is, therefore, possible to supply fuel in a finely atomized form so as to minimize combustion efficiency variations for the respective cylinders and minimize output torque variations over the entire range of engine operating conditions. In addition, the control unit 40 prolongs the determined time length in response to a demand for engine acceleration produced when the one fuel injector is in its open position. It is, therefore, possible to provide good engine performance in engine acceleration.

The control unit 40 may comprise a digital computer which includes a central processing unit (CPU), a random access memory (RAM), a read only memory (ROM), and an input/output circuit. The central processing unit communicates with the rest of the computer via a data bus. The input/output control circuit includes an analog-to-digital converter and a fuel injection control circuit. The analog-to-digital converter receives analog signals from the throttle position sensor, the intake flow meter, the cylinder-head coolant temperature sensor and the battery voltage sensor and it converts the received signals into digital form for application to the central processing unit. The A to D conversion process is initiated on command from the central processing unit which selects the input channel to be converted. The read only memory contains the program for operating the central processing unit and further contains appropriate data in look-up tables used in calculating appropriate values for fuel delivery requirements. Control words specifying desired fuel delivery requirements are periodically transferred by the central processing unit to the fuel injection control circuit which converts them into a fuel injection pulse signal for application to operate the fuel injector 20.

Figure 2:
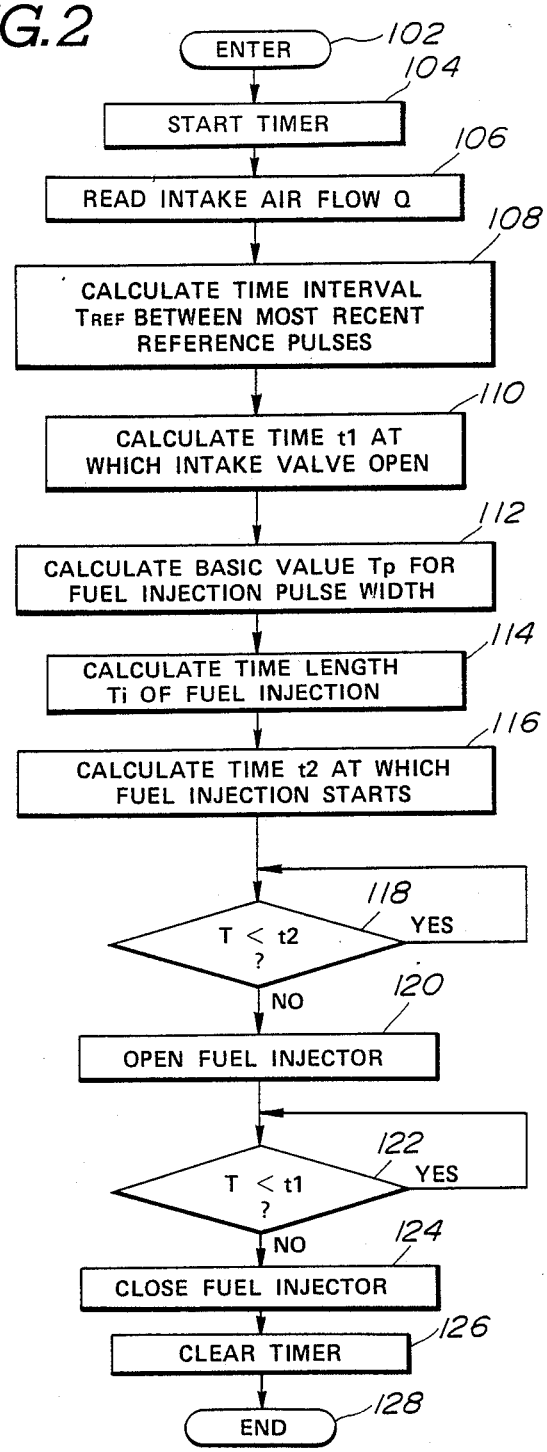
FIG. 2 is a flow diagram illustrating the programming of the digital computer as it is used to determine fuel-injection time-length and timing.

FIG. 2 is a flow diagram illustrating the programming of the digital computer as it is used to determine fuel-injection time-length and timing.

The computer program is entered at the point 102 each time a reference electrical pulse is generated from the reference pulse generator 26. At the point 104 in the program, the digital computer central processing unit provides a command to start a timer. The timer may be a counter adapted to count clock pulses. In this case, the counter accumulates a count which indicates the time lapse T after the reference electrical pulse is generated from the reference pulse generator 26. At the point 106, the intake airflow signal Q fed from the intake airflow meter 24 is converted into digital form and read it into the computer memory. Similarly, at the point 108, the time interval $T_{REF}$ between the most recent reference electrical pulses is calculated and read into the computer memory.

At the point 110 in the program, a time interval tl at which the corresponding intake valve opens after the reference electrical pulse is generated is calculated from a relationship programmed into the computer. This relationship defines the time interval tl as tl=$T_{REF}$×A where A is a constant corresponding to the ratio of the number of degrees of rotation of the engine crankshaft from the position at which the reference electrical pulse is generated to the position at which the corresponding intake valve opens to the number of degrees of rotation of the engine crankshaft corresponding to the interval between the most recent reference electrical pulses.

At the point 112 in the program, a basic value Tp for fuel delivery requirement, in the form of fuel-injection pulse-width, is calculated from a relationship programmed into the computer. This relationship defines fuel-injection pulse-width basic value Tp as Tp=K×Q×$T_{REF}$ where K is a constant. At the point 114 in the program, the length of time tl the corresponding fuel injector is in its open position is calculated as Ti=Tp×COEF+Ts where COEF is a correction factor determined by the sensed engine operating conditions including throttle position θ and cylinder-head coolant temperature Tw, and Ts is a correction factor determined by the sensed battery voltage VB. At the point 116, a time t2 at which fuel injection is to be started is calculated as t2=tl−Ti.

At the point 118 in the program, a determination is made as to whether or not the time lapse T is smaller than the calculated time t2. If the answer to this question is "yes", then the program returns to the point 118. Otherwise, the program proceeds to the point 120 where the digital computer central processing unit provides a command to cause the fuel injection control circuit to open the corresponding fuel injector 20.

At the point 122 in the program, another determination is made as to whether or not the time lapse T is smaller than the calculated time interval tl. If the answer to this question is "yes", then the program returns to the point 122. Otherwise, the program proceeds to the point 124 where the digital computer central processing unit provides a command to cause the fuel injection control circuit to close the corresponding fuel injector 20. After the timer is cleared at the point 126, the program proceeds to the end point 128.

Figure 3:
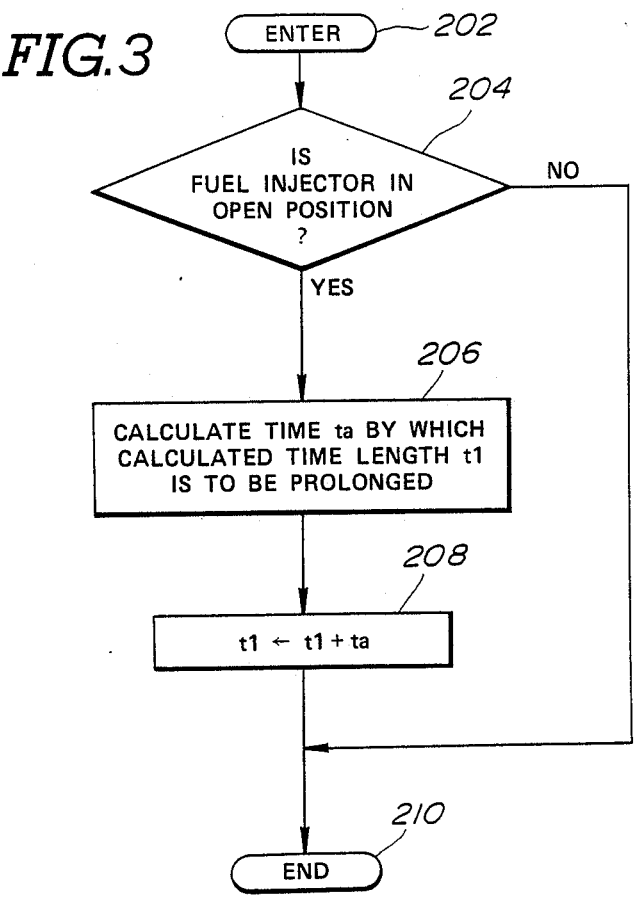
FIG. 3 is a flow diagram illustrating the programming of the digital computer as it is used to prolong the fuel-injection time-length.

FIG. 3 is a flow diagram illustrating the programming of the digital computer as it is used to prolong the fuel-injection time-length when a demand occurs for engine acceleration with the corresponding fuel injector being in its open position.

The computer program is entered at the point 202 whenever the sensed throttle position 0 changes at a rate $θ_{DIF}$ greater than zero. At the point 204 in the program, a determination is made as to whether or not the corresponding fuel injector is in its open position. If the answer to this question is "yes", then the program proceeds to the point 206 where the digital computer central processing unit calculates a time ta by which the calculated time length tl is to be prolonged as a function of the rate $θ_{DIF}$ of change of the throttle position θ. At the point 208 in the program, the time tl at which the corresponding fuel injector is closed is changed to tl+ta. Following this, the program proceeds to the end point 210.

It the answer to the question inputted at the point 204 is "no", then the program proceeds directly to the end point 210.

Therefore, it is possible to provide a sufficient fuel supply to the corresponding cylinder so as to minimize shock and emission of noxious pollutants due to an increased air supply to the corresponding cylinder when a demand for engine acceleration occurs with the corresponding fuel injector being in its open position.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the embodiments shown which can be embodied without departing from the principle of the invention set out in the appended claims.

Figure 5:
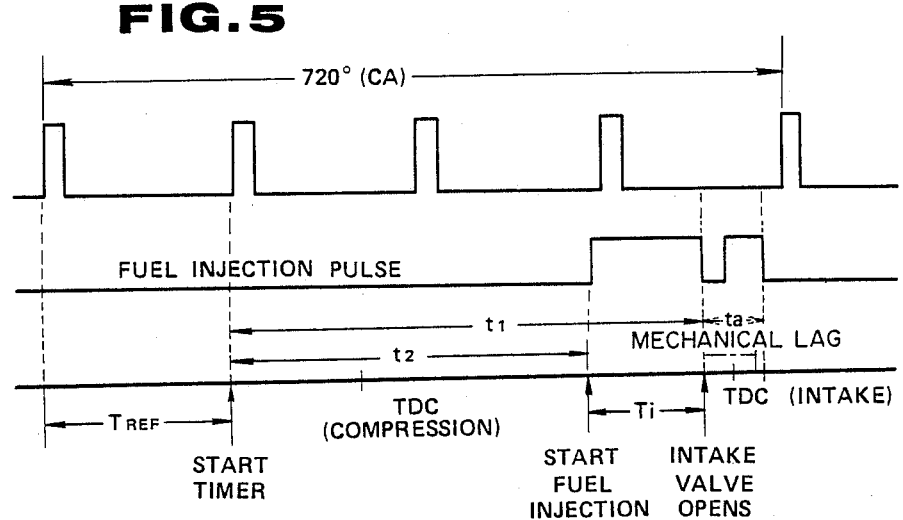
FIG. 5 is a time graph showing another process for performing an extra amount of fuel injection in acceleration enrichment.

For example, though the foregoing embodiment performs prologation of the fuel injection by lengthening the fuel injection pulse width which has a leading edge defining the fuel injection starting time and trailing edge defining the fuel injection terminating time, it may be possible to prolong the fuel injection period by producing an additional fuel injection pulse within a substantially short period after termination of the normal fuel injection pulse width. The interval between the normal fuel injection pulse and the additional fuel injection pulse has to be shorter than the mechanical lag time of the fuel injector, as shown in FIG. 5. By this, the fuel injector can be maintained in an open position until the time at which the additional fuel injection pulse terminates. In this way, substantially the same effect of acceleration enrichment with quick response to the acceleration demand can be achieved.

What is claimed is:

1. An apparatus for use with a multi-cylinder internal combustion engine including a plurality of fuel injectors, each being operable in its open position for injecting fuel into an intake port with which an intake valve cooperates for regulating the entry of combustion ingredients into the corresponding cylinder, comprising:

sensor means sensitive to select conditions of said engine for producing sensor signals indicative of sensed engine conditions; and a control circuit operating said fuel injectors in a predetermined sequence, said control circuit including means responsive to said sensor signals for determining a fuel injection starting time and a fuel injection terminating time based thereon so that said fuel injection terminating time substantially coincides to the opening time of an intake valve of an intake port of a corresponding one of said engine cylinders, said control circuit including means for operating one of said fuel injectors to open at said determined fuel injection starting time and to close at said determined fuel injection terminating time said, said control circuit including means for modifying said fuel injection terminating time for providing a controlled magnitude of delay in response to a demand for engine acceleration.

2. The apparatus as set forth in claim 1, wherein said control circuit further includes means for detecting a rate of change of throttle position, and said means for modifying said fuel injection terminating time determines said magnitude of delay according to said detected rate of change of said throttle position.

3. A fuel injection control apparatus for use with a multi-cylinder internal combustion engine including:

a plurality of fuel injectors, each operable in its open position to inject fuel into an intake port;

an intake valve associated with each of said fuel injectors for cooperatively regulating the entry of combustion ingredients into the corresponding cylinder;

sensor means producing sensor signals indicative of selected engine conditions; and a control circuit including means for operating said fuel injectors in a predetermined sequence, said control circuit determining, in response to said sensor signals, the fuel injection starting time and terminating time, said terminating time substantially corresponding to the opening time of said intake valve of said corresponding cylinder, said control circuit further including means for controlling said intake valve to be maintained at an open position beyond said determined terminating time for providing a given magnitude of delay in said terminating time for the injection of fuel in controlled response to the fuel demands of engine acceleration.

4. The apparatus as set forth in claim 3, wherein said control circuit further includes means for sensing a rate of change of throttle position and extending the time during which said fuel injectors provide fuel to said corresponding cylinder in response to a detected throttle position change rate.

5. A fuel injection control system for use in a multi-cylinder internal combustion engine including:

an air induction system for forming an air/fuel mixture and introducing said air/fuel mixture into the combustion chamber of each engine cylinder;

a plurality of fuel injectors, each associated with an engine cylinder, each of said fuel injectors injecting a controlled amount of fuel into said induction system to form and introduce said air/fuel mixture into said combustion chamber of each said engine cylinder, said fuel injectors adjusting the amount of fuel to be injected by varying the period from the start of injection to its termination;

sensor means monitoring selected engine driving parameters, including engine speed and engine load and producing sensor signals indicative thereof;

first means for determining fuel injection amount on the basis of said sensor signals;

second means responding to said first means for determining the duration of fuel injection periods from fuel injection start to termination, said second means terminating fuel injection at substantially the same time as the opening of an intake valve of a corresponding engine cylinder; and third means for detecting an engine acceleration demand to cause delay of fuel injection terminating timing for expansion of the period to perform fuel injection for acceleration enrichment.

6. A fuel injection control system for a multi-cylinder internal combustion engine comprising:

an induction system for forming an air/fuel mixture and introducing said air/fuel mixture into the combustion chamber of each engine cylinder;

a plurality of fuel injectors, each associated with an engine cylinder, for injecting a controlled amount of fuel into said induction system to form said air/fuel mixture, each of said fuel injectors determining the amount of fuel injected into each said cylinder by adjusting the duration of the fuel injection period;

sensor means for monitoring preselected engine driving parameters, including engine speed, engine load and producing sensor signals indicative thereof;

first means for determining the amount of fuel to be injected from said sensor signals;

second means for determining fuel injection starting and terminating times on the basis of said amount of said fuel to be injected, in response to said first means, said second means terminating said fuel injection to substantially coincide with the opening of an intake valve of the associated engine cylinder; and third means for detecting engine acceleration fuel demand and in response thereto lengthening the period during which fuel is injected into each said cylinder.

7. A fuel injection control system for a multi-cylinder internal combustion engine comprising:

an induction system for forming an air/fuel mixture and introducing said air/fuel mixture into the combustion chamber of each engine cylinder;

a plurality of fuel injectors, each associated with an engine cylinder, for injecting a controlled amount of fuel into said induction system to form said air/fuel mixture, each said fuel injectors determining the amount of fuel injected into each said cylinder by adjusting the duration of the fuel injection period;

sensor means for monitoring preselected engine driving parameters, including engine speed, engine load and producing sensor signals indicative thereof;

first means for determining the amount of fuel needed on the basis of said sensor signals;

second means for determining the fuel injection starting time and terminating time on the basis of said fuel needed in response to said first means, said second means setting said fuel injection terminating time to substantially coincide with opening of an associated intake valve; and third means for monitoring throttle valve angular position and detecting any increase of throttle valve open angle at a rate greater than a predetermined rate to detect engine acceleration fuel demand, and in response to said demand, extending the period of fuel injection for each cylinder.

8. A fuel injection control system for a multi-cylinder internal combustion engine comprising:

an induction system for forming an air/fuel mixture and introducing said air/fuel mixture into the combustion chamber of each engine cylinder;

a plurality of fuel injectors, each associated with an engine cylinder, for injecting a controlled amount of fuel into said induction system to form said air/fuel mixture, each of said fuel injectors determining the amount of fuel injected into each said cylinder by adjusting the duration of the fuel injection period;

sensor means for monitoring preselected engine driving parameters, including engine speed, engine load and producing sensor signals indicative thereof;

first means for deriving a fuel injection pulse having a pulse width defining an amount of fuel to be injected on the basis of said sensor signals;

second means for setting the fuel injection terminating time at a time substantially corresponding to the time at which an intake valve of the associated engine cylinder and deriving the fuel injection starting time on the basis of said fuel injection pulse width; and third means for detecting engine acceleration fuel demand and in response thereto delaying said fuel injection terminating time for lengthening the period during which fuel is injected into each said cylinder.

9. A fuel injection control system for a multi-cylinder internal combustion engine comprising:

an induction system for forming an air/fuel mixture and introducing said air/fuel mixture into the combustion chamber of each engine cylinder;

a plurality of fuel injectors, each associated with an engine cylinder, for injecting a controlled amount of fuel into said induction system to form said air/fuel mixture, each of said fuel injectors determining the amount of fuel injected into each said cylinder by adjusting the duration of the fuel injection period;

sensor means for monitoring preselected engine driving parameters, including engine speed, engine load and producing sensor signals indicative thereof;

first means for determining a fuel injection pulse width basically on the basis of said engine speed and said engine load and modifying said fuel injection pulse width on the basis of selected correction parameters represented by said sensor signals;

second means for determining the fuel injection starting time by setting the fuel injection terminating time at a time substantially coincident with opening of the associated intake valve and on the basis of said fuel injection pulse width; and third means for monitoring throttle valve angular position and detecting any increase of throttle valve open angle at a rate greater than a predetermined rate to detect engine acceleration fuel demand, and in response to said demand, extending the period of fuel injection for each said cylinder.

10. The fuel injection control system as set forth in claim 8, wherein said third means expands said fuel injection pulse width for lengthening the period in which fuel is injected, in response to said acceleration fuel demand.

11. The fuel injection control system as set forth in claim 10, wherein the magnitude of expansion of said fuel injection pulse width is variable depending upon the magnitude of said acceleration fuel demand.

12. The fuel injection control system as set forth in claim 8 wherein said third means produces an additional fuel injection pulse signal defining an extra fuel injection period within a given period after said fuel injection terminating time for retriggering said fuel injector to maintain the latter open through said extra fuel injection period.

13. The fuel injection control system as set forth in claim 12, wherein said third means produces said additional fuel injection pulse signal within a mechanical lag time of said fuel injector so that said fuel injector can be maintained open after said fuel injection terminating time.

14. The fuel injection control system as set forth in claim 13, wherein said third means derives the pulse width of said additional fuel injection pulse on the basis of the magnitude of acceleration fuel demand.

* * * * *